(12) United States Patent
Hofmann et al.

(10) Patent No.: US 11,781,634 B2
(45) Date of Patent: Oct. 10, 2023

(54) GIRTH GEAR

(71) Applicant: Hofmann Engineering Pty Ltd, Bassendean (AU)

(72) Inventors: Karl Hofmann, Bassendean (AU); Leighton White, Bassendean (AU)

(73) Assignee: Hofmann Engineering Pty Ltd, Bassendean (AU)

( * ) Notice: Subject to any disclaimer, the term of this patent is extended or adjusted under 35 U.S.C. 154(b) by 0 days.

(21) Appl. No.: 16/661,741

(22) Filed: Oct. 23, 2019

(65) Prior Publication Data

US 2020/0124155 A1 Apr. 23, 2020

(30) Foreign Application Priority Data

Oct. 23, 2018 (AU) ................................ 2018904020
Aug. 21, 2019 (AU) ................................ 2019903055

(51) Int. Cl.
*F16H 55/12* (2006.01)
*F16H 55/17* (2006.01)

(52) U.S. Cl.
CPC ............. *F16H 55/12* (2013.01); *F16H 55/17* (2013.01)

(58) Field of Classification Search
CPC .... F16H 55/12; F16H 55/17; F16H 2055/175; Y10T 74/1993; Y10T 74/19893; Y10T 74/19926; Y10T 74/19874; F16F 15/30
USPC .................................................... 74/448, 450
See application file for complete search history.

(56) References Cited

U.S. PATENT DOCUMENTS

| 596,784 | A | * | 1/1898 | Mullin | F16H 55/12 74/448 |
| 752,898 | A | * | 2/1904 | Fogarty | F16H 55/12 74/448 |
| 3,742,779 | A | * | 7/1973 | Shaver | F16H 55/12 74/448 |
| 4,538,769 | A | * | 9/1985 | Wisnia | B02C 17/18 241/179 |
| 4,622,860 | A | * | 11/1986 | Cametti | F16C 19/30 384/593 |
| 5,553,367 | A | * | 9/1996 | Mahoney | F16B 5/02 29/402.08 |

(Continued)

FOREIGN PATENT DOCUMENTS

CA 1158217 A 12/1983
CN 203209919 U 9/2013
(Continued)

OTHER PUBLICATIONS

European Patent Office, "extended European search report and written opinion", issued in connection with corresponding European Patent Application No. 19204884.1, dated Mar. 2, 2020, 10 pages.

*Primary Examiner* — Gregory Robert Weber
(74) *Attorney, Agent, or Firm* — Nyemaster Goode, P.C.

(57) ABSTRACT

A girth gear is provided, formed by a plurality of gear segments which are adapted to be secured together in an end to end arrangement to form the girth gear. Each gear segment includes a rim and a web extending from an underside of the rim. Each gear segment also includes at least one flange at each end of the gear segment for joining each gear segment together when the gear segments are in an end to end arrangement. The at least one flange has a side secured to one of the web or the rim.

8 Claims, 10 Drawing Sheets

(56) References Cited

U.S. PATENT DOCUMENTS

| | | | | |
|---|---|---|---|---|
| 6,023,990 A | * | 2/2000 | Carr | F16H 55/06 |
| | | | | 74/450 |
| 6,125,713 A | * | 10/2000 | Langlois | B23P 6/00 |
| | | | | 29/402.01 |
| 9,416,862 B2 | * | 8/2016 | Wu | F16H 55/12 |
| 2018/0283521 A1 | * | 10/2018 | Wu | F16H 55/12 |

FOREIGN PATENT DOCUMENTS

| | | | | |
|---|---|---|---|---|
| DE | 2157328 A1 | | 5/1972 | |
| DE | 8328742 U1 | | 12/1983 | |
| DE | 102016010084 A1 | * | 4/2017 | F16H 55/17 |
| FR | 1595057 | * | 12/1968 | |
| WO | 2017069626 A1 | | 4/2019 | |

* cited by examiner

GIRTH GEAR

CROSS-REFERENCE TO RELATED APPLICATION

This application claims priority to Australian Patent Application No. 2018904020, filed on Oct. 23, 2018, entitled "Helical Girth Gear," and Australian Patent Application No. 2019903055, filed on Aug. 21, 2019, entitled "Girth Gear," the disclosures of which are each incorporated herein by reference in their entireties.

BACKGROUND

Girth gears are used to drive large, rotating systems such as mills. Large girth gears are typically constructed in a number of segments for ease of transportation, handling and installation. These segments are typically assembled at site to form the gear. These segments are bolted together with a traditional flange arrangement, as shown in FIGS. 1 and 2.

The two most common girth gears are helical girth gears, in which the gear's teeth are cut at an angle to the axis of rotation, and spur gears, in which the gear's teeth are parallel to the axis of rotation. As meshed helical gears have more teeth in contact with mating gears/pinion at any time, helical gears can transmit higher loads than spur gears of the same size. However, due to the angle of the teeth, the helical gears exert/experience greater thrust loads than a spur gear. The magnitude of these thrust loads is dependent on the tangent of the helix angle.

To accommodate the large loads of thrust generated, girth gears use thrust bearings to help support the thrust load. In addition, the gears include additional means to add rigidity/stiffness to the gear. These features enable a greater portion of the thrust load to be transferred from the gear to the thrust bearings, but they also create high areas of stress.

The most highly stressed region of any girth gear structure is located nearest the joints, where the mating segments are connected. As a result, joint regions and the joints themselves are the most frequent areas of structural failure of girth gears. To minimize the stresses in this region the joint design must provide accurate alignment of mating segments. This is achieved by providing the gear segment with a joining flange 11 which is adapted to mate with a joining flange of an adjacent segment (see FIGS. 1 and 2), before being secured together using a plurality of bolts which pass through the two joining flanges 11. Each joining flange is fixed to both the rim 13 and the web 15 of the gear segment by full penetration welds 17. In effect, this eliminates any movement of the flange 11 relative to any point on the gear segment other than the flanges to create a high stiffness region at the ends of each gear segment. To stiffen the regions between the ends of each gear segment, which would otherwise provide regions of low stiffness, a number of gussets 19 are spaced between the gear segment ends. Similar to the flanges 11, each gusset is fixed to both the rim 13 and the web 15 of the gear segment by full penetration welds.

A disadvantage of conventional gusseted girth gears is that, as a result of their rigidity, the gear is not able to flex to accommodate inaccuracies within the system, such as misalignment of/with other gears. This leads to poor and heavy localized contact between mating teeth. This further leads to premature failure due to surface deterioration (pitting) and fatigue in addition to the inability to efficiently transmit high torques before inevitably failing.

The regions between gussets provide regions of flexibility, which is in contrast to the highly stiffened regions near each gear segment and the gussets. During rotation, the girth gear experiences cyclic loading and unloading due to these regions of varying stiffness. The fluctuating loads lead to inconsistent tooth contact about the flank of a tooth leading to localized stresses, fatigue and misalignment. This further exasperates the wear experienced by the gear.

The preceding discussion of the background art is intended to facilitate an understanding of the present disclosure only. The discussion is not an acknowledgement or admission that any of the material referred to is or was part of the common general knowledge as at the priority date of the application.

SUMMARY

Disclosed is a girth gear formed by a plurality of gear segments which are adapted to be secured together in an end to end relationship to form the girth gear, having a rim, and a web extending from an underside of the rim, and a flange at each end of the gear segment for joining each gear segment together when the gear segments are in an end to end arrangement, wherein the flange has a first side secured to one of the web or the rim.

In securing the first side to either the web or to the rim, the first side may be welded thereto, or may be formed to be integral therewith, or may be secured in another manner as would be readily understood by a person skilled in the art.

In the embodiment whereby the first side of the at least one flange is secured to the web, the at least one flange has a second side adjacent to, but spaced from the rim.

Each end of each gear segment includes two flanges, one on each side of the web, whereby the first side of each flange is secured to the web.

In another embodiment whereby the first side of the flange is secured to the rim, the flange has a second side adjacent to, but spaced from the web.

Each end of each gear segment includes two flanges, one on each side of the web, whereby the first side of each flange is secured to the rim.

In yet another embodiment whereby the first side of the flange is secured to the rim, the web may terminate a distance inward from each end of each gear segment. Preferably, when the girth gear is assembled a void is formed around the abutting flanges at the ends of the gear segments. As the space around the abutting flanges is void of the web, the flanges are independent of the web, increasing the degree of flex of the assembled gear compared with an assembled gear having a continuous web.

Each end of each gear segment includes one flange which spans substantially across the width of the segment. Alternatively, each end of each gear segment includes more than one flange which collectively span substantially across the width of the segment.

In yet another embodiment, provided is a girth gear formed by a plurality of gear segments secured together in an end to end relationship to form the girth gear, each gear segment including a rim, and a web extending from an underside of the rim, a flange at each end of the gear segment for joining each segment together. The flange has a first side secured to or integral with the rim and the web is spaced from the flange at each end to form a void around the abutting flanges at the ends of the gear segments when the girth gear is assembled. The web incorporates a void around each flange at each end such that the web is spaced from each flange to be independent thereof.

In one embodiment each end of each gear segment includes two flanges, one on each side of the web, whereby the first side of each flange is secured to the rim. The flange may have a second side which is adjacent to, but spaced from the web.

In another embodiment an end of the web adjacent the rim may terminate a distance inward from each end of the gear segment. Preferably, when the gear is assembled a void is provided around the flanges.

Each end of each gear segment includes one flange which spans substantially across the width of the segment. Alternatively, each end of each gear segment includes more than one flange which collectively span substantially across the width of the segment.

In still another embodiment, provided is a gear segment, the gear segment attached to other gear segments to form a girth gear, the gear segment including a rim and a web secured to an underside of the rim, a flange secured at each end of the gear segment, the flange co-operates with a flange on another gear segment to enable the gear segments to be fixed together, wherein the flange has a first side secured to the rim, and wherein the web is spaced from the flange to form a void around the flange such that the flange is not directly connected to the web.

In one arrangement, an end face of each end of the gear segment is in a radial plane of the assembled girth gear. In this arrangement the end face includes an end of the rim and the outwardly facing surface of the flange.

In another arrangement, an end face of each end of the gear segment is in a plane at an angle to the axis of the assembled girth gear. Preferably the end face of each end of the gear segment is in a plane which is parallel to the angle of the teeth on the rim. In this arrangement the end face includes an end of the rim and the outwardly facing surface of the flange.

In yet another embodiment, provided is a girth gear formed by a plurality of gear segments secured together in an end to end relationship to form the girth gear, each gear segment including a rim and a web extending from an underside of the rim, a flange at each end of the gear segment for joining each segment together, wherein each flange has a first side secured to the web, and a second side spaced from the rim.

In still another embodiment, provided is a gear segment, the gear segment attached to other gear segments to form a girth gear, the gear segment including a rim and a web secured to an underside of the rim, a flange secured at each end of the gear segment, each flange co-operates with a flange on another gear segment for joining the gear segments together, wherein each flange has a first side secured to the web, and a second side spaced from the rim.

Preferably, each flange comprises a first flange portion and a second flange portion, the first flange portion having a first side secured to the web, and the second flange portion having a first side secured to the web such that the first flange portion and second flange portion are spaced from each other by the web, wherein each flange portion is spaced from the rim.

Preferably, the second side of each flange is spaced from an underside of the rim such that a gap is defined therebetween. The gap may be sufficient in width to allow the rim to flex within a predetermined range. The predetermined range may be governed by the configuration of the web and the rim.

In one arrangement an end face of each end of the gear segment is in a radial plane of the assembled girth gear. In this arrangement the end face may comprise an end of the rim and the outwardly facing surface of the flange.

In another arrangement an end face of each end of the gear segment is in a plane at an angle to the axis of the assembled girth gear. Preferably the end face of each end of the gear segment is in a plane which is parallel to the angle of the teeth on the rim. In this arrangement the end face may comprise an end of the rim and the outwardly facing surface of the flange. Such an arrangement may be suitable for a helical girth gear.

The flange may have a plurality of holes therethrough. During assembly of the girth gear the plurality of holes may align with a plurality of holes in the flange of an adjoining gear segment. Each set of aligned holes may receive a fastener for securing gear segments together.

Preferably, when adjacent gear segments are in end to end abutment, a hole may be defined therein for receiving a dowel. This arrangement assists in alignment of adjacent gear segments with each other.

Preferably, the hole is defined on each side of the joined gear segments, the hole may have an opening on the side of the adjacent gear segments and may extend inwardly such that an axis of the hole is parallel to the rotational axis of the assembled girth gear.

The opening may be positioned such that half of the opening is provided in the end face of the gear segment, while the other half of the opening is provided in the end face of the adjacent gear segment.

The axis of the hole on one side of the adjacent gear segments may be offset to the axis of the hole on the other side of the adjacent gear segments with an end of a different gear segment, a hole may be defined thereby.

The web may be fixed to the underside of the rim by a full penetration weld extending along the web on either side of the web. This is the sole means of connection between the web and the flange.

In one embodiment the rim may have a projection on the underside and extending inwardly. There may be two projections wherein each projection is positioned either side of the web. Each projection may have a first edge welded to the underside of the rim, and a second edge spaced from the web, and a third edge spaced from the second end of the flange. Each projection may have a plurality of holes therein through which fasteners may pass through when securing adjacent gear segments. With this embodiment there is no requirement to incorporate means to accommodate a dowel.

In yet another embodiment, provided is a girth gear formed by a plurality of gear segments which secured together in an end to end relationship to form the girth gear, each gear segment having a flange secured at each end of the gear segment for joining each segment together, wherein each flange at each end of each gear segment has a first side fixed to a web of the gear segment, and a second side spaced from a rim of the gear segment.

In still another embodiment, provided is a gear segment for forming a girth gear, the gear segment having a flange secured at each end of the gear segment, the flange adapted to co-operate with a flange on another gear segment for joining the gear segments together, wherein the flange has a first side fixed to a web of the gear segment, and a second side spaced from a rim of the gear segment. Where there are two flanges at each end, the flanges may be secured in opposed relation with the flange therebetween.

In yet another embodiment, provided is a gear segment for forming a girth gear, the gear segment having a flange secured at each end of the gear segment, the flange co-operates with a flange on another gear segment for joining the gear segments together, wherein the flange has a first side fixed to a rim of the gear segment forming a void around the flange.

The gear segments of the girth gear may include stiffening means to stiffen the assembled gear. The stiffening means may be in the form of one or more gussets. The gussets may be positioned to extend between the web and the rim or the flange and the rim. The gussets may be in the form of triangular plates welded in position, blocks of material welded into position or any other means as would be known by a person skilled in the art. The gussets may extend between the flange and the rim. The gussets may be applied in the event the assembled girth gear is too flexible.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

DETAILED DESCRIPTION

For purposes of description herein, the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure provides a girth gear which permits self-alignment, transmitting higher torques with greater efficiency while reducing risk of pitting, fatigue and fracture failure. While the disclosure is applicable to all types of girth gears, the embodiments shown and discussed below, are directed to helical girth gears. As would be understood to a person skilled in the art the present disclosure is readily applied to all types of girth gears and these are considered to fall within the scope of the present invention.

Figure 1:
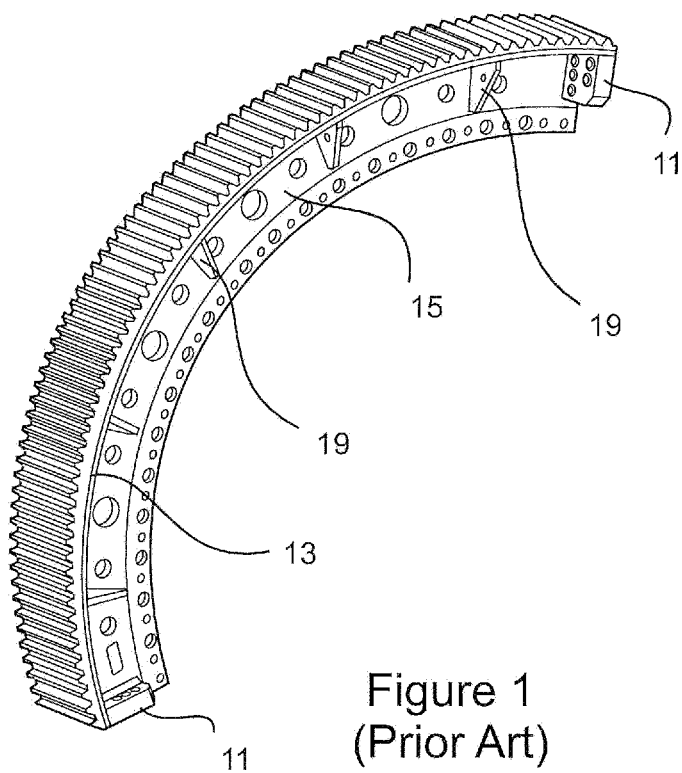
FIG. 1 is a perspective view of a gear segment according to the prior art.
Figure 2:
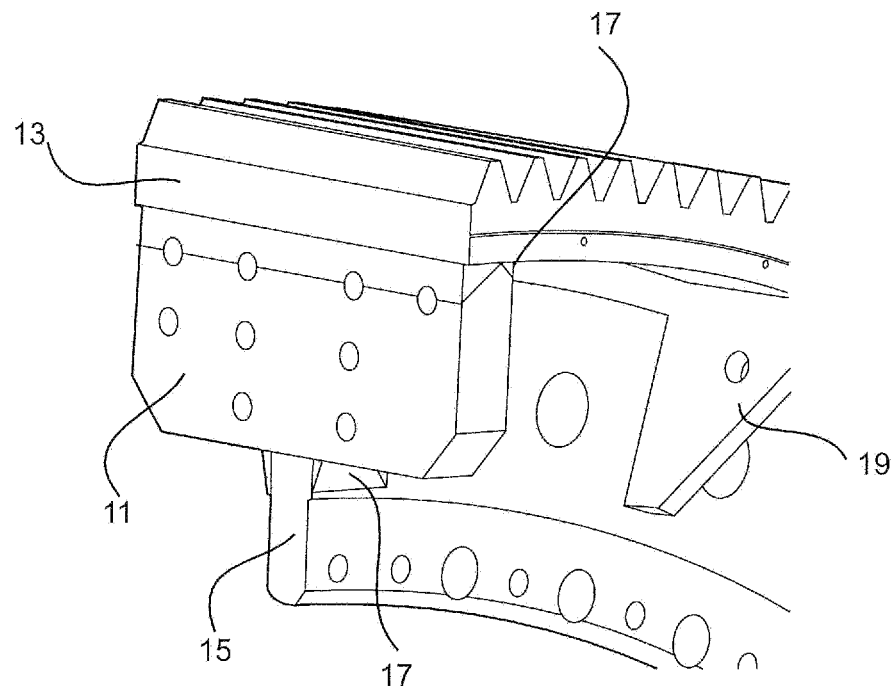
FIG. 2 is an end perspective view of an end of the gear segment of FIG. 1.
Figure 3:
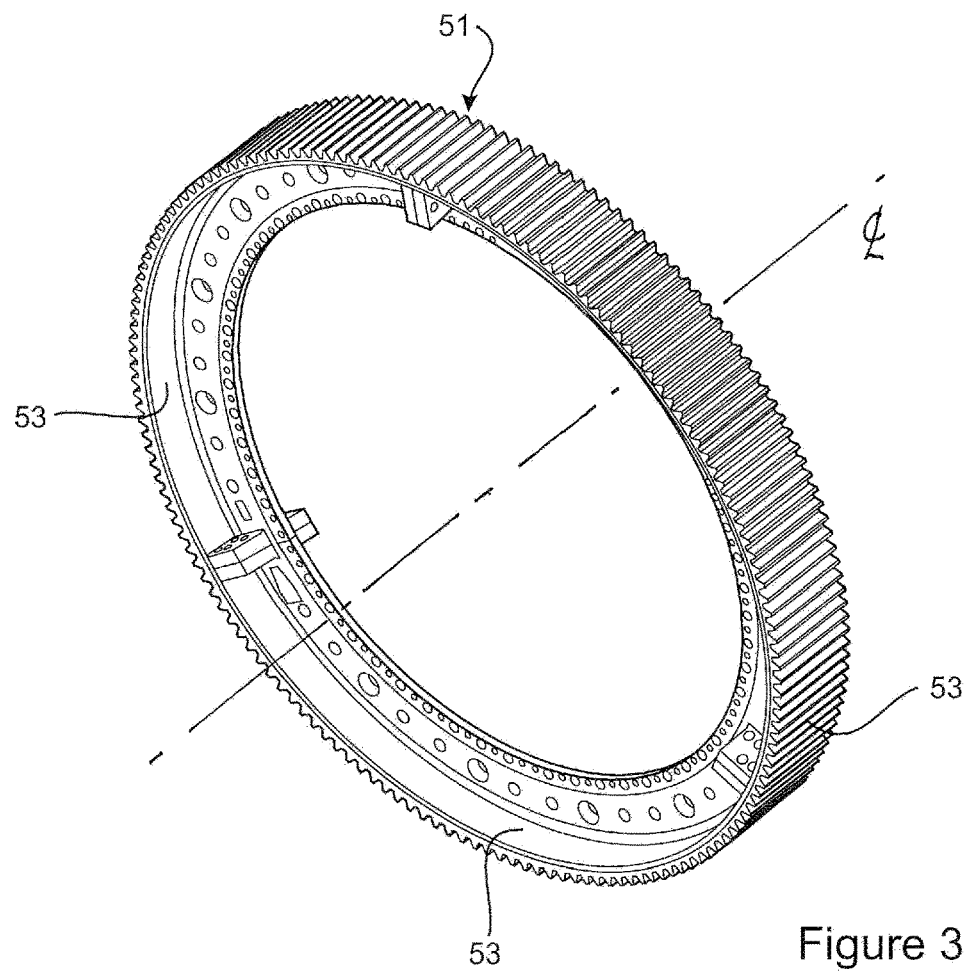
FIG. 3 is a perspective view of a helical girth gear according to a first embodiment of the invention.
Figure 4:
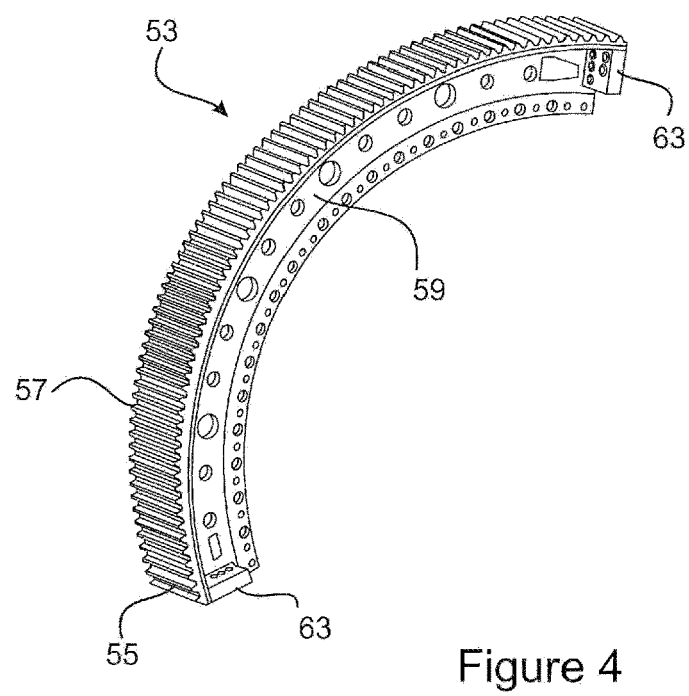
FIG. 4 is a perspective view of a gear segment of the helical girth gear shown in FIG. 3.

Referring to FIGS. 3 to 7, a first embodiment is in the form of a helical girth gear 51 comprising three gear segments 53. While the present embodiment relates to three gear segments, it is equally applicable to helical girth gears which comprise any number of gear segments. Each gear segment 53 is identical in construction and is adapted to be arranged in an end to end arrangement before fastening adjacent ends to each other, as shown in FIG. 3.

Each gear segment comprises a rim 55 which provides a plurality of teeth 57. As this is a helical girth gear the longitudinal extent of the teeth 57 is at an angle to the rotational axis α of the assembled helical girth gear 51.

Fixed to an underside 58 of the rim 55 is a web 59. The cross section of the rim 55 and the web 59 may be 'T' shaped. The web 59 is fixed to the rim 55 by a penetration weld 61 extending along the length of the junction between the rim 55 and the web 59 on either side of the web 59. In the present embodiment the weld 61 at the junction is the only connection between the rim 55 and the web 59.

Each end of each gear segment 53 provides a flange 63 either side of the web 59. The flanges 63 assist to secure adjacent gear segments 53 when adjacent ends are in abutment.

Figure 5:
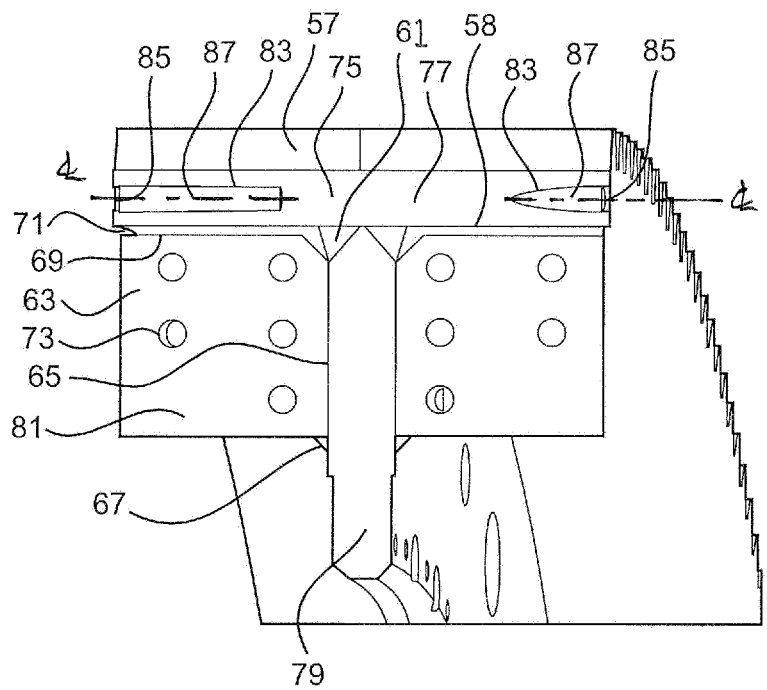
FIG. 5 is an end perspective view of an end of the gear segment of FIG. 4.

As best shown in FIG. 5, each flange 63 has a first side 65 secured to the web by penetration welds 67. A second side 69 of each flange 63 is spaced from the underside 58 of the rim 55 to define a gap 71 therebetween. By providing this gap, movement of the rim is only constrained by its connection with the web. As a result, the rim is able to flex relative to the web.

Each flange also provides a plurality of holes 73 which pass therethrough. These holes receive fasteners when securing adjacent gear segments 53 to form the helical girth gear 51.

Referring again to FIG. 5, an end face 75 of each gear segment 53 comprises a rim end face 77, a web end face 79, and an outwardly facing surface 81 of the flange 63. In this embodiment, the end face 75 is in a plane which is parallel to the longitudinal extent of the teeth 57. As a result, the end face 75 is in a plane which is at an angle to the rotational axis α of the helical girth gear 51. This angle can be zero in cases of spur girth gears.

Figure 6:
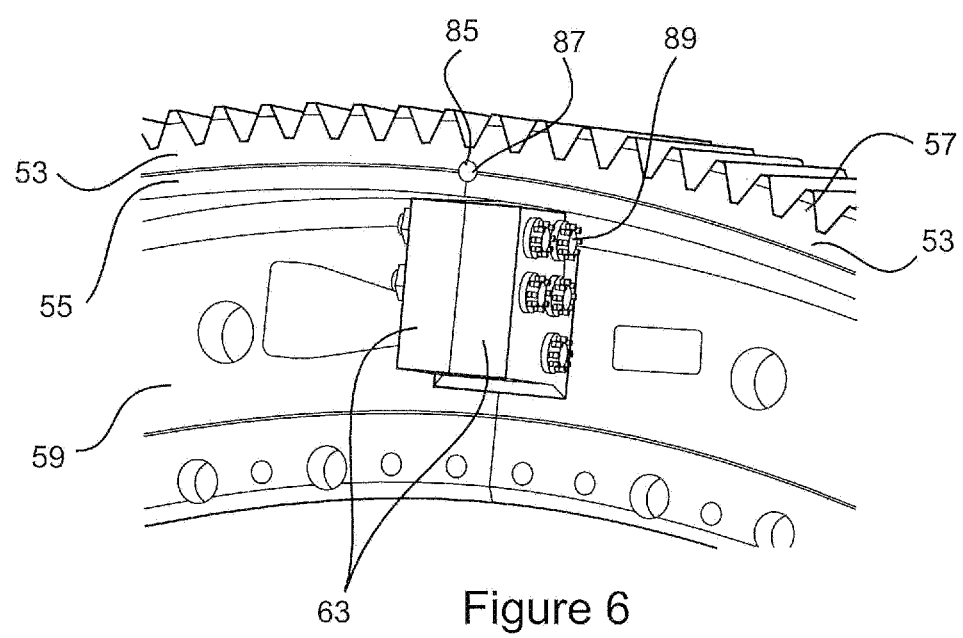
FIG. 6 is a side view showing the connection between adjacent gear segments.
Figure 7:
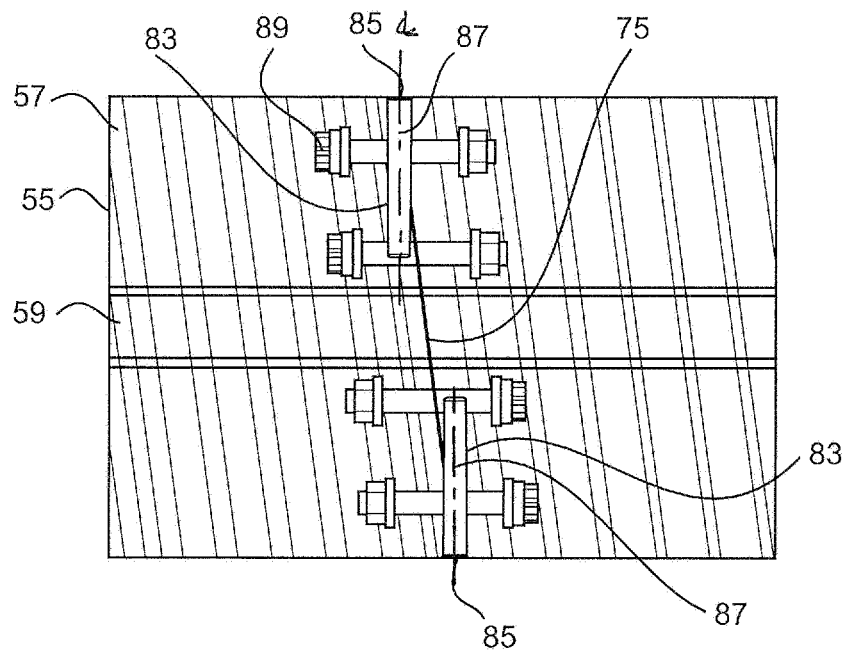
FIG. 7 is a top plan view showing the connection between adjacent gear segments wherein the figure shows configurations of a pair of dowels.

Referring to FIGS. 5, 6 and 7, the helical girth gear 51 incorporates two holes 83 in each side of the helical girth gear 51 at each joint between adjacent gear segments 53. Each hole has an opening 85 which is positioned such that half of the opening 85 is incorporated in the end face 75 of one gear segment 53, and the other half of the opening 85 is incorporated in the end face 75 of the adjacent gear segment 53, as best shown in FIG. 6.

The axis β of each hole 83 is parallel to the rotational axis α of the assembled helical girth gear 51. As the end face 75 is in a plane which is at an angle to the rotational axis α of the assembled helical girth gear 51, the holes 83 associated with the joint between segments are offset from each other. This arrangement is best shown in FIG. 7.

Each hole 83 is adapted to receive a dowel 87. The dowel 87 ensures that there is minimal movement between the two mating end faces 75 of adjacent gear segments 53. The dowels 87 verify that the adjacent gear segments 53 are properly aligned and that the helical girth gear 51 is able to function in the same/similar manner as a non-divided helical girth gear.

When assembling the helical girth gear 51 adjacent gear segments 53 are brought together such that the holes 73 in each flange 63 are in alignment. Fasteners 89 are then placed into the holes 73 and fastened such that the end faces 75 of each gear segment are held in abutment with each other. Dowels 87 are then placed into the holes 83 before the fasteners 89 are tightened to the required torque to secure the gear segments 53 together.

In operation, the rim 55 of the helical girth gear 51 is able to flex relative to the web 59 to accommodate loads placed on the helical girth gear 51. The extent of flex is limited to the width of the gap 71 between the flange 63 and the underside 58 of the rim 55.

Figure 8:
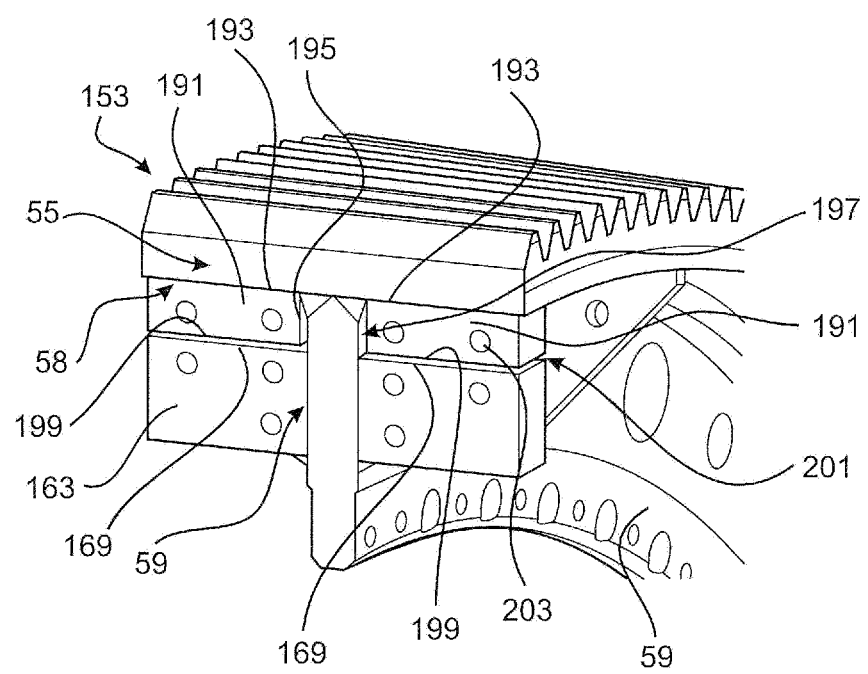
FIG. 8 is an end perspective view of an end of the gear segment according to a second embodiment of the invention.

Another non-limiting embodiment of the invention is illustrated in FIG. 8. For convenience, features of this embodiment that are similar or correspond to features of the first embodiment have been referenced with the same reference numerals.

In this embodiment the end of each gear segment 153 includes a projection 191 either side of the web 59. Each projection 191 has a first edge 193 fixed to the underside 58 of the rim 55 using a penetration weld. Each projection 191 has a second edge 195 which is spaced from the web 59 to define a first gap 197 therebetween, and a third edge 199 which is spaced from a second side 169 of a flange 163 to define a second gap 201 therebetween. In this embodiment the second gap 201 provides the same function as the gap 71 in the first embodiment to allow the rim to flex relative to the web.

Each projection 191 has a number of holes 203 therein. During assembly, these holes 203 are caused to align with corresponding holes in the projections of adjacent gear segments before fasteners are placed therein to secure the gear segments together. With this embodiment the fasteners which pass through the projection 191 are positioned sufficiently close to the transmission point on the rim to align and retain adjacent gear segments in fixed relation. This then negates the need to use dowels to assist with alignment and retention of adjacent gear segments, as was detailed in the first embodiment.

Another embodiment of the invention is illustrated in FIGS. 9 to 12. For convenience, features of this embodiment that are similar or correspond to features of the previous embodiments have been referenced with the same reference numerals.

Figure 9:
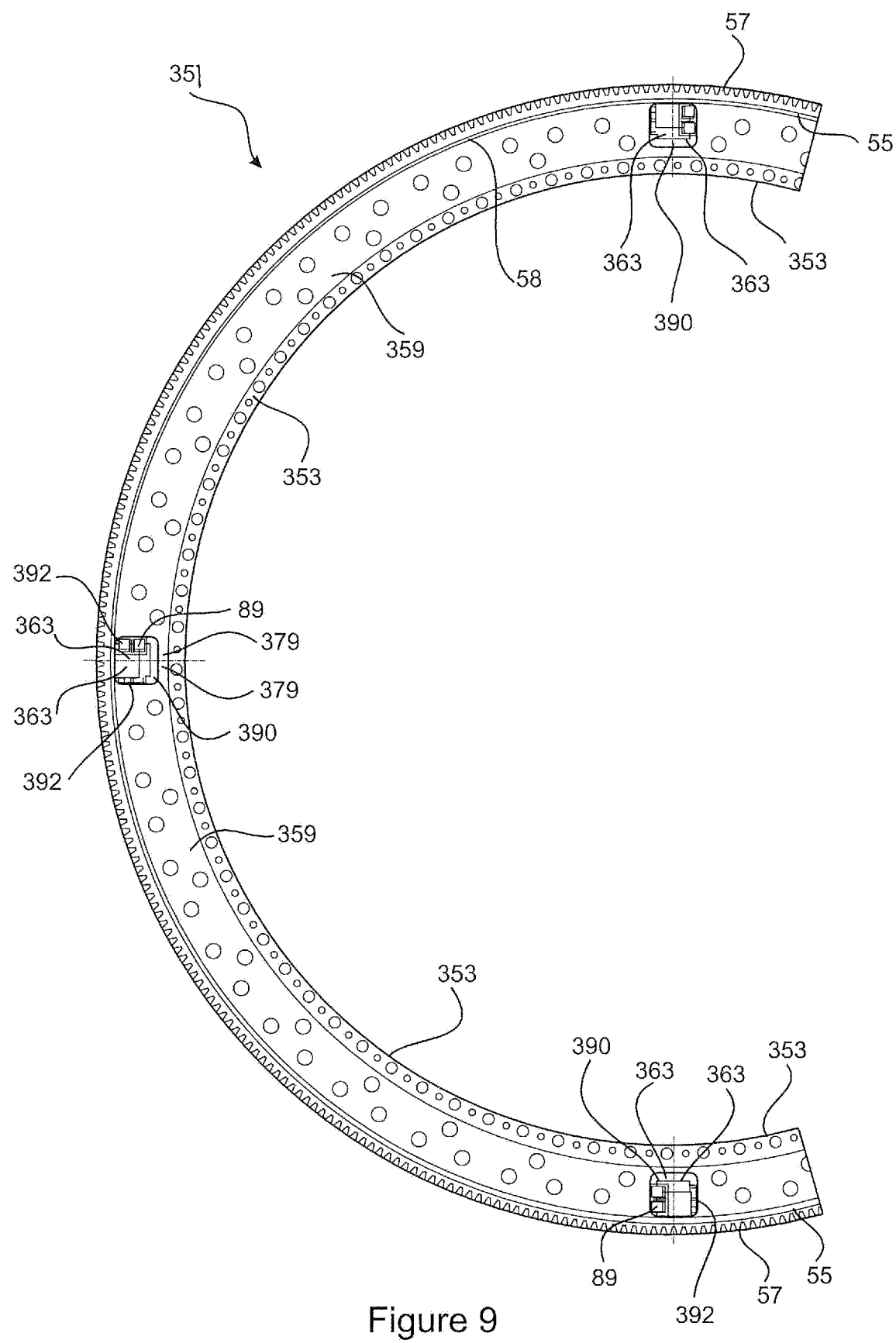
FIG. 9 is a perspective view of a portion of a helical girth gear according to a third embodiment of the invention.
Figure 10:
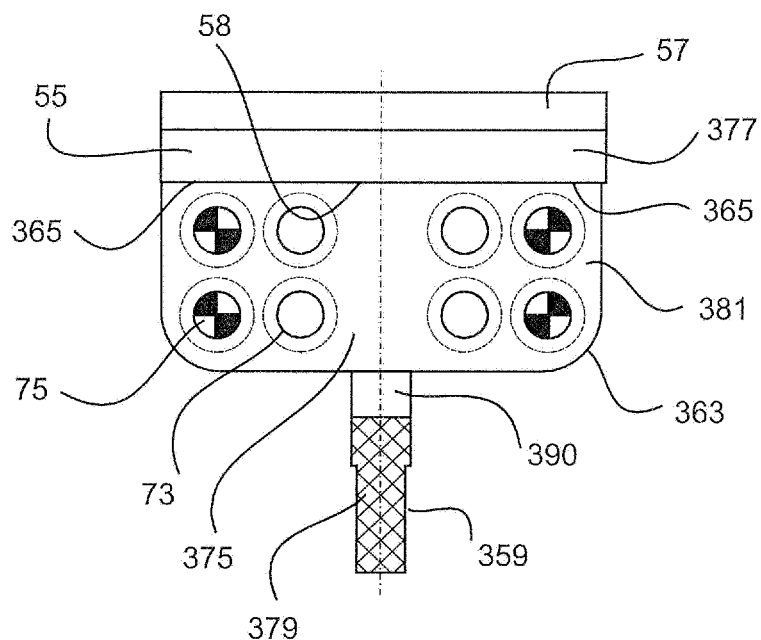
FIG. 10 is a sectional view taken through section A-A on FIG. 9.
Figure 11:
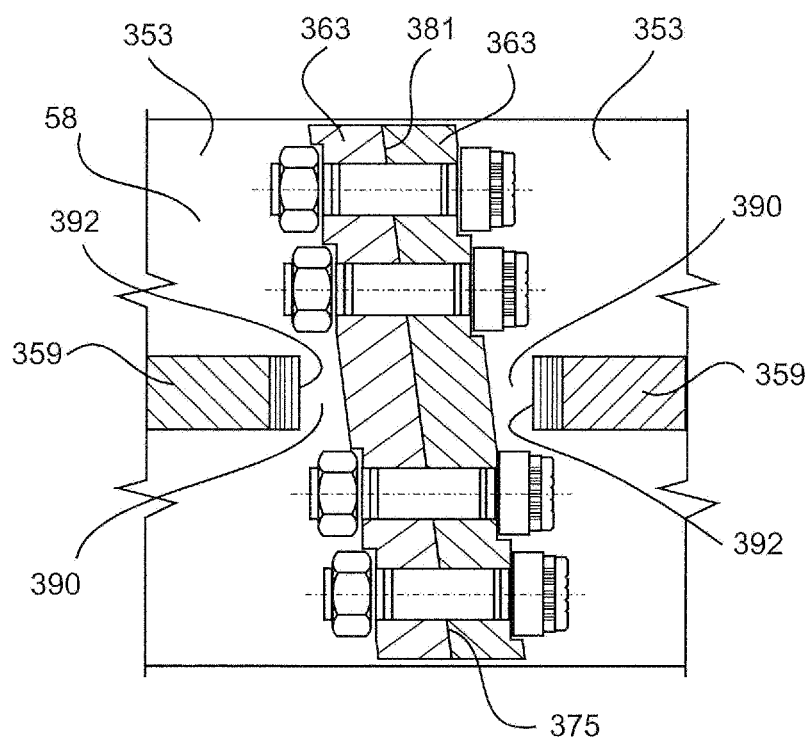
FIG. 11 is a sectional view taken through section C-C on FIG. 9.
Figure 12:
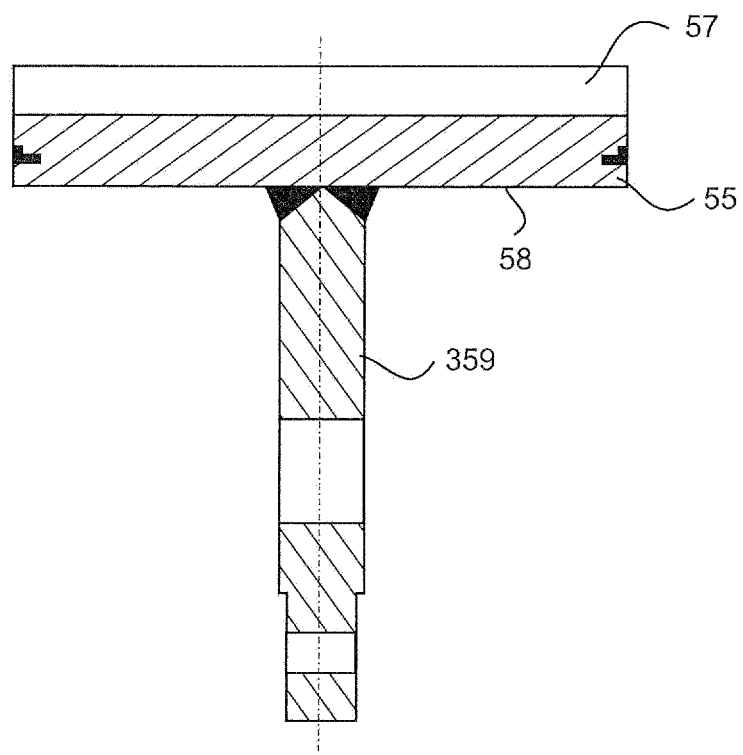
FIG. 12 is a sectional view taken through section B-B on FIG. 9.

Referring to FIGS. 9 to 12, the invention, according to this embodiment of the invention, is in the form of a helical girth gear 351 comprising four gear segments 353. Each gear segment 353 is identical in construction and is adapted to be arranged in an end to end arrangement before fastening adjacent ends to each other, as shown in FIGS. 9, 10 and 11.

Each gear segment comprises a rim 55 which provides a plurality of teeth 57. As this is a helical girth gear the longitudinal extent of the teeth 57 is at an angle to the rotational axis α of the assembled helical girth gear 351.

Each end of each gear segment 353 provides a flange 363. The flanges 363 assist to secure adjacent gear segments 353 when adjacent ends are in abutment.

Fixed to an underside 58 of the rim 55 is a web 359. As best shown in FIGS. 9 and 11, an inner end 392 of the web 359 adjacent the rim 55 terminates inwardly of the end of the gear segment. An outer end 379 of the web 359 remote from the rim 55 terminates at the end of the gear segment such that when the helical gear is assembled, the outer ends 379 of adjacent gear segments are in face to face contact. With this configuration the web incorporates a void 390 around the flange 363 at each end of the gear segment.

As best shown in FIG. 10, each flange 363 has a first side 365 secured to the rim 55 and is positioned to be located in the void 390 provided by the web 359 such that the flange 363 is independent of the web 359. By locating the flange 363 in the web void 390, movement of the web is only constrained by its connection with the rim. As a result, the assembled gear has a higher degree of flex when compared with prior art gears.

Each flange also provides a plurality of holes 73 which pass therethrough. These holes receive fasteners when securing adjacent gear segments 353 to form the helical girth gear 351.

Referring to FIGS. 10 and 11, an end face 375 of each gear segment 353 comprises a rim end face 377, a web end face 379, the void 390, and an outwardly facing surface 381 of the flange 363. In this embodiment the end face 375 is in a plane which is parallel to the longitudinal extent of the teeth 57. As a result the end face 375 is in a plane which is at an angle to the rotational axis α of the helical girth gear 351.

Figure 13:
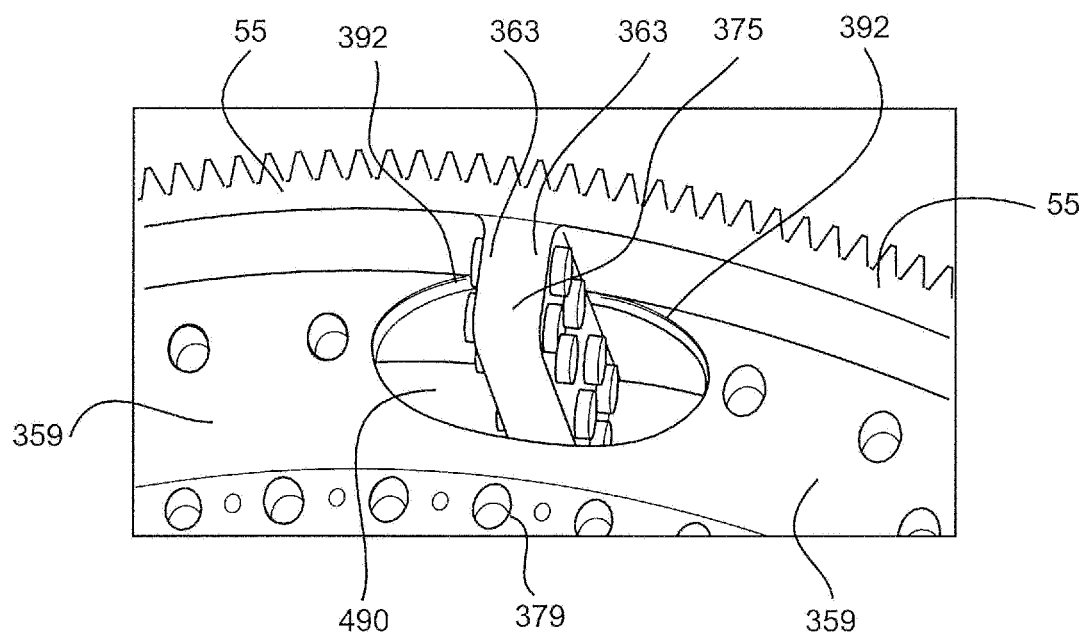
FIG. 13 is a perspective view of two joined gear segments of a helical girth gear according to a fourth embodiment of the invention.
Figure 14:
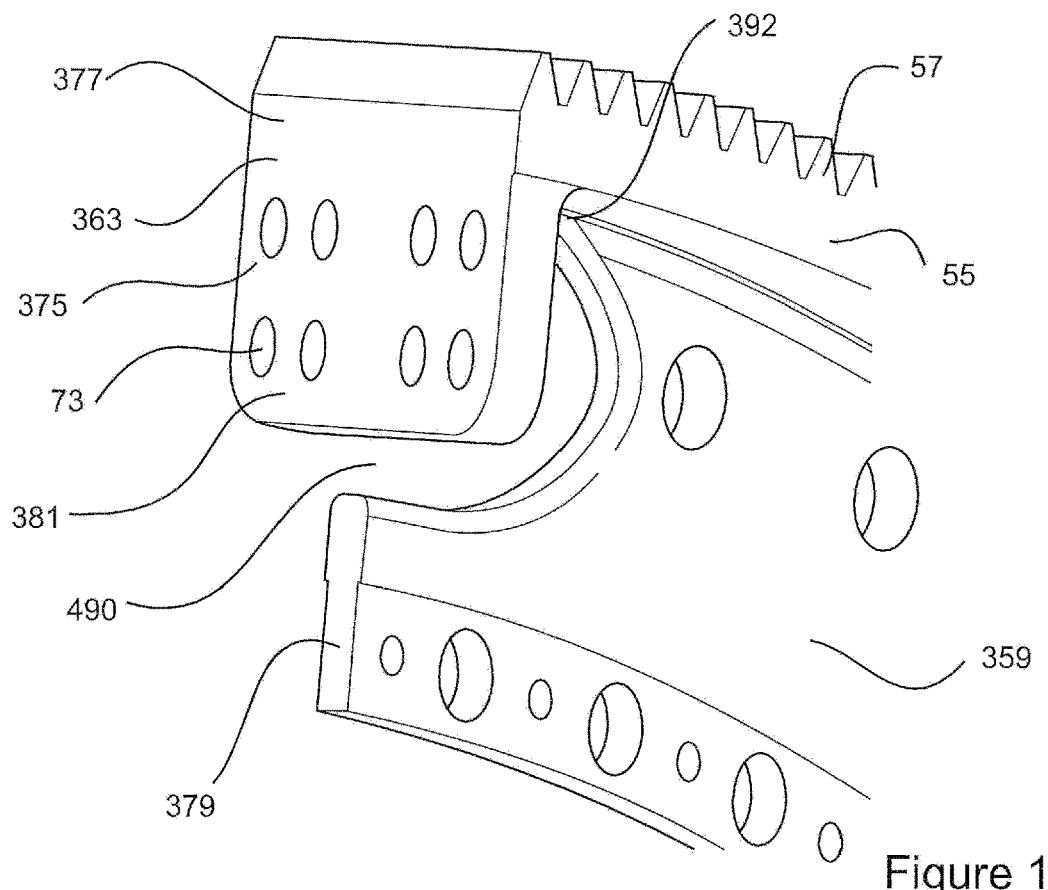
FIG. 14 is a front perspective view of an end of the gear segment of FIG. 13.
Figure 15:
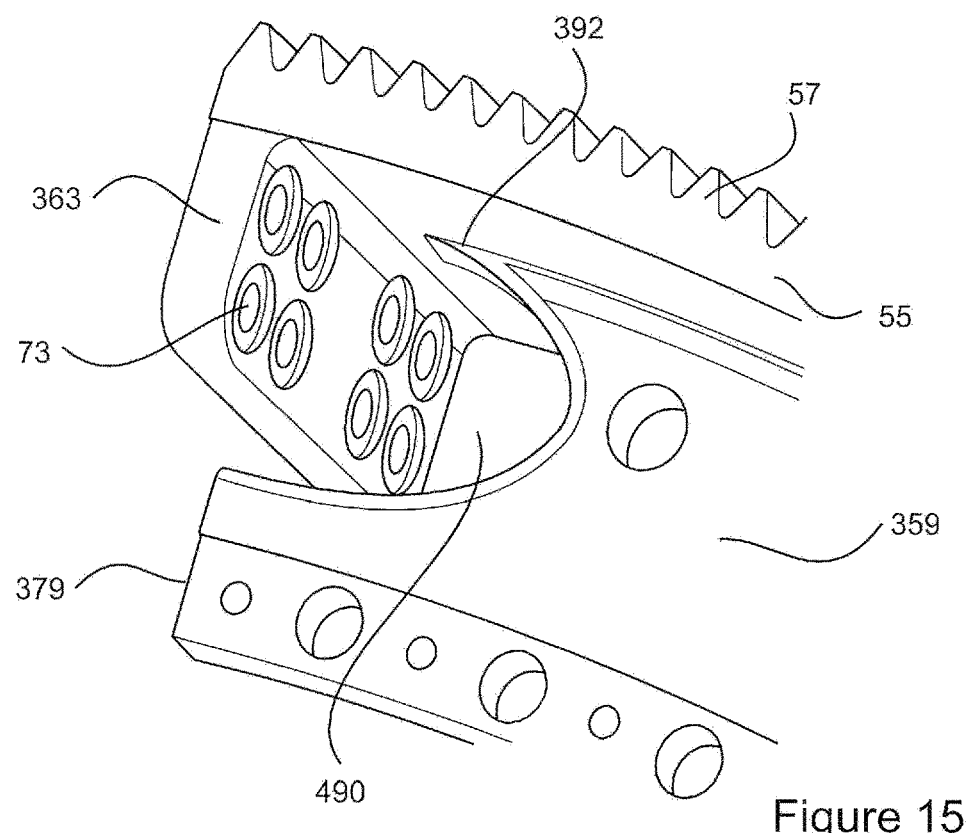
FIG. 15 is a rear perspective view of an end of the gear segment of FIG. 13.

Another embodiment of the invention is illustrated in FIGS. 13 to 15. For convenience, features of this embodiment that are similar or correspond to features of the previous embodiments have been referenced with the same reference numerals.

This embodiment is similar to that of the previous embodiment and differs only in respect of the shape of a void 490 incorporated in the web 359 at each end of each gear segment 353. The shape of the void 490 provides a different distribution of stresses within the web 359 than the void 390 depicted in the previous embodiment.

Figure 16:
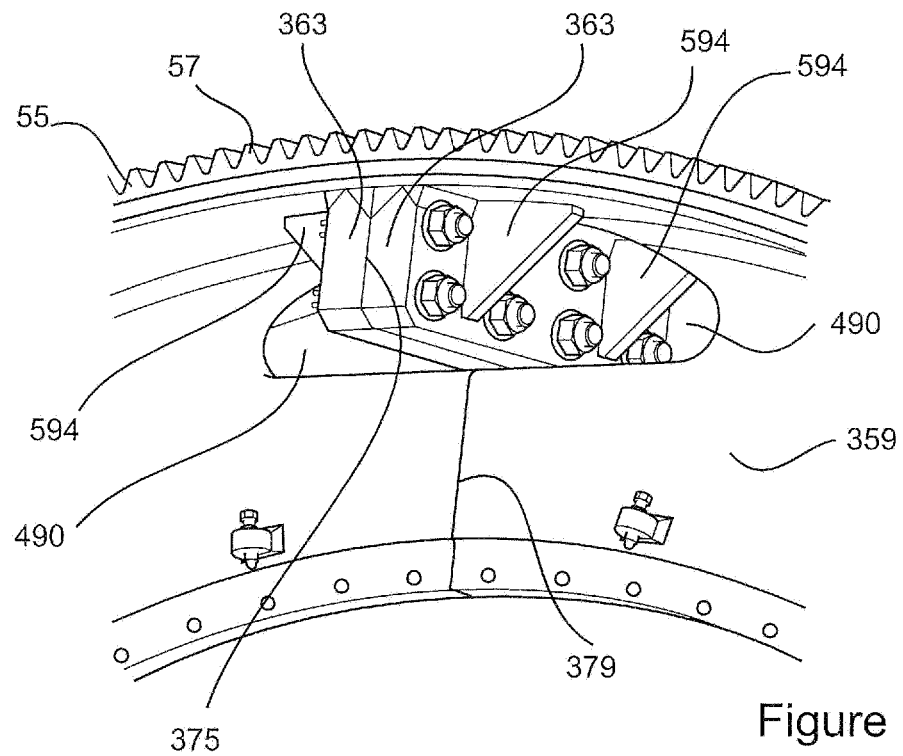
FIG. 16 is a perspective view of two joined gear segments of a helical girth gear according to a fifth embodiment of the invention.

Another embodiment of the invention is illustrated in FIG. 16. For convenience, features of this embodiment that are similar or correspond to features of the previous embodiments have been referenced with the same reference numerals.

This embodiment is similar to that of the previous embodiment and differs only in respect of the addition of a stiffening means, which in this embodiment is provided by a plurality of gussets 594. The gussets 594 may be added to the gear segments to limit the flex of the helical gear.

Figure 17:
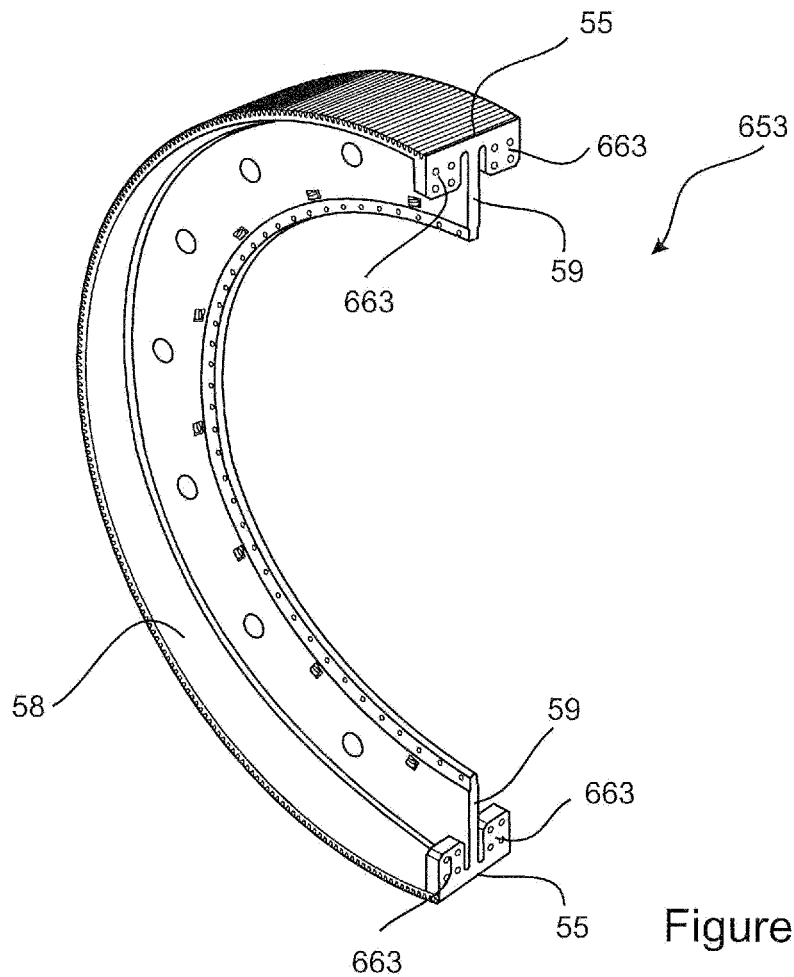
FIG. 17 is a perspective view of a gear segment of a helical girth gear according to a sixth embodiment of the invention.
Figure 18:
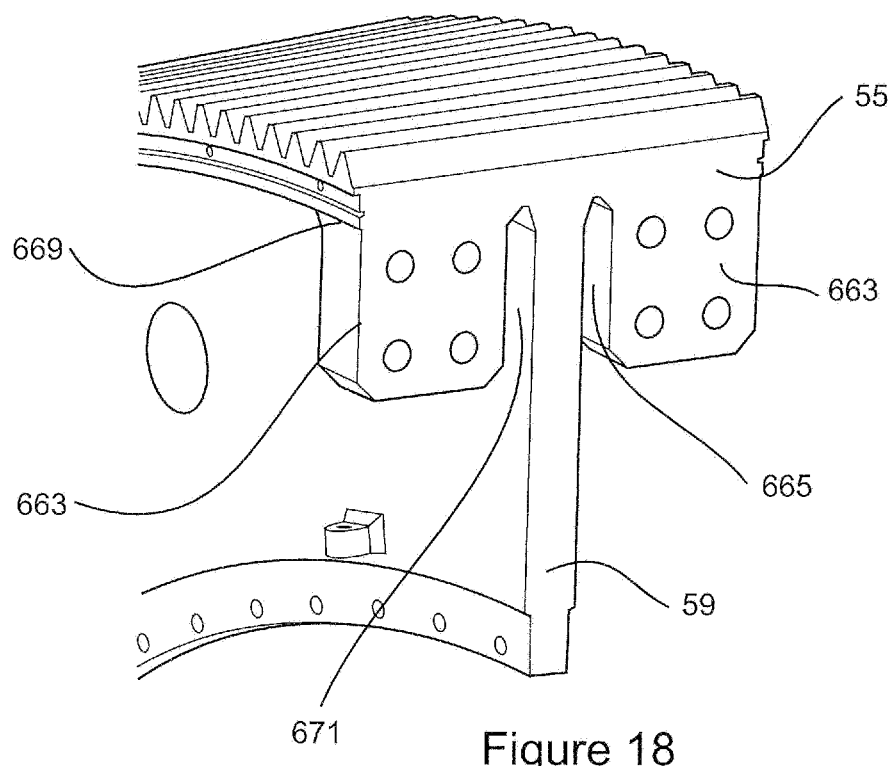
FIG. 18 is a front perspective view of an end of the gear segment of FIG. 17.
Figure 19:
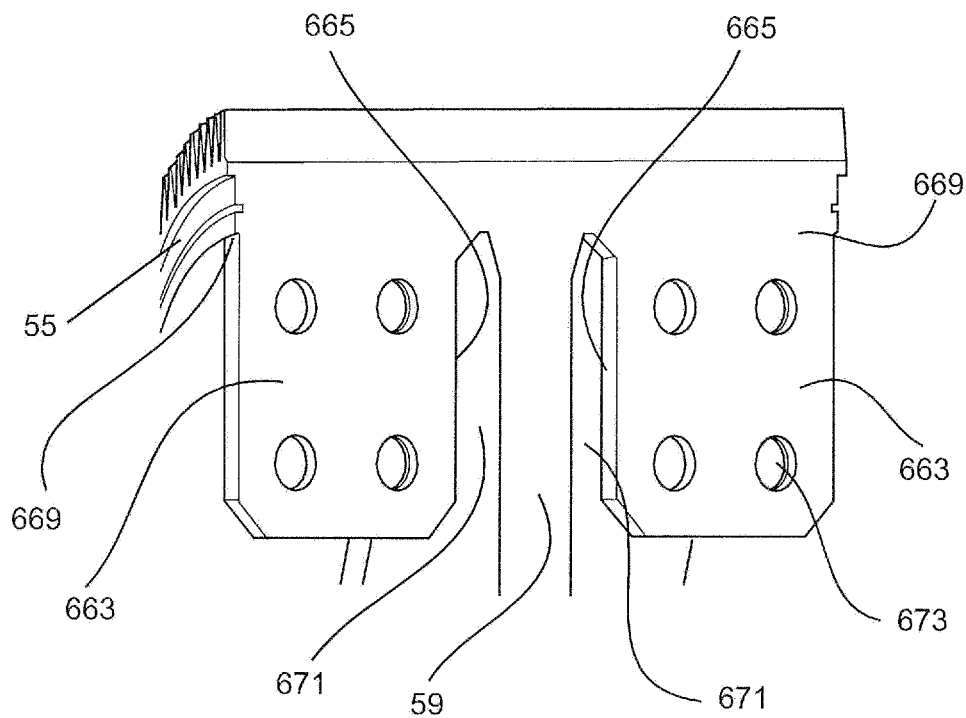
FIG. 19 is an enlarged view of the end of the gear segment shown in FIG. 18.

A gear segment 653 of another embodiment of the invention is illustrated in FIGS. 17 to 19. The gear segment 653 is similar to the gear segment 53 of the first embodiment, differing in that a flange 663 of the gear segment 653 is fixed relative to the rim 55, as opposed to being fixed to the web, as is the case in the first embodiment. For convenience, features of this embodiment that are similar or correspond to features of the first embodiment have been referenced with the same reference numerals.

Referring to FIGS. 17 to 19, each flange 663 has a first side 665 spaced from the web 59 to define a gap 671 therebetween. A second side 669 of each flange 663 is fixed to the underside 58 of the rim 55. By providing the gap between the web and the flange, movement of the web is only constrained by its connection with the rim. As a result, the rim is able to flex relative to the web.

Each flange 663 may be fixed to the underside 58 of the rim 55 by welding, or each flange may be formed integrally with rim. Other means of fixing each flange 663 to the rim as would be understood by a person skilled in the art, are considered to fall within the scope of this invention.

Each flange also provides a plurality of holes 673 which pass therethrough. These holes received fasteners (not shown) when securing adjacent gear segments 653 to form the helical girth gear 651.

The girth gear facilitates tooth contact when at full load, the gear rim then has the capability to flex to adjust to variations in alignment the gear may experience during operation, ensuring optimal efficiency during operation. The extremities of the rim are no longer constrained to the web permitting the self-alignment of the gear in operation.

In addition, as the present invention provides the gear with increased flexibility, there is consistent, non-fluctuating loads on the teeth in mesh about the full circumference of the gear. This minimizes the Hertzian stresses witnessed on the gear flank which would otherwise lead to a high fatigue resistance capability.

The present disclosure minimizes the regions of high stiffness in the gear to permit a full tooth contact surface for efficient power transmission. This is counter intuitive to the prior art where stiffness within the gear is considered critical to ensure maximum load transfer.

In contrast to the prior art, the present disclosure and claimed invention removes regions of high stiffness at the ends of the gear segment, and enhances the degree of flex inherent in the assembled gear. Due to the construction of the present invention the rim, and therefore the teeth supported on the rim, are able to flex relative to the web to accommodate variations in load as well as alignment. The fluctuating stresses that are typically experienced by prior art girth gears due to heavy localized contact are dampened through flexing of the rim/teeth in response to points of heavy contact. The flexing of the rim, and therefore the movement of the gear teeth towards the point of heavy contact opens up the rest of the contact surface to increase the contact surface between teeth, resulting in a decrease in the overall stress on the gear teeth.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, such as other types of girth gears, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee.

While the invention has been shown and described with reference to certain exemplary embodiments thereof, it will be understood by those skilled in the art that various changes in form and details may be made therein, and various aspects of the different embodiments may be combined, without departing from the spirit and scope of the invention as defined by the appended claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprise", "comprises," "comprising," "including," and "having," or variations thereof are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Such variations are not to be regarded as a departure from the disclosure, and all such modifications are intended to be included within the scope of the disclosure.

It will be understood by one having ordinary skill in the art that construction of the described invention and other components is not limited to any specific material. Other exemplary embodiments of the invention disclosed herein may be formed from a wide variety of materials, unless described otherwise herein.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A girth gear formed by a plurality of gear segments which are adapted to be secured together in an end to end arrangement to form the girth gear, each gear segment comprising:
    a rim, and a web extending from a central region of an underside of the rim; and
    at least two flanges at each end of the gear segment for joining each gear segment together when the gear segments are in an end to end arrangement, each of the two flanges being positioned on either side of the web;
    wherein at each end of each gear segment each flange has a first side secured to or formed integrally with the rim, and a second side most adjacent to the web spaced therefrom such that a gap is provided between each flange and the web.

2. The girth gear according to claim 1, wherein an end face of each end of the gear segment lies in a radial plane of the assembled girth gear, wherein the end face comprises an end of the rim and the outwardly facing surface of the flange.

3. The girth gear according to claim 1, wherein the end face of each end of the gear segment is in a plane which is parallel to an angle of the teeth on the rim, wherein the end face comprises an end of the rim and the outwardly facing surface of the flange.

4. The girth gear according to claim 1, wherein each flange has a plurality of holes therethrough whereupon assembly of the girth gear the plurality of holes are aligned with a plurality of holes in the flange of an adjoining gear segment, each set of aligned holes can then receive a fastener for securing gear segments together.

5. The girth gear according to claim 1, wherein each end of the gear segment is of a planar configuration comprising an end face of the rim, an end face of the web and an end face of each of the two flanges.

6. A gear segment for forming a girth gear, the gear segment comprising: at least two flanges secured at each end of the gear segment, the at least two flanges are adapted to co-operate with a flange on another gear segment for joining the gear segments together, wherein at each end of each gear segment each flange has a first side fixed to or integrally formed with a rim of the gear segment, and wherein at each end of each gear segment a web is spaced from the at least one flange such that a gap is defined between the web and each flange such that the flange is not fixed to the web, wherein the web extends from a central portion of a concave underside of the rim.

7. The gear segment according to claim 6 further comprising stiffening means to stiffen the assembled girth gear, the stiffening means being provided by one or more gussets, wherein the one or more gussets are positioned to extend between the web and the rim or the at least one flange and the rim.

8. A girth gear formed by a plurality of gear segments which are adapted to be secured together in an end to end arrangement to form the girth gear, each gear segment comprises:
    a rim, and a web extending from a central portion of a concave underside of the rim; and
    at least one flange at each end of the gear segment for joining each gear segment together when the gear segments are in an end to end arrangement,
    the at least one flange having a first side extending substantially in an axial direction of the girth gear and a second side, closest to the web and extending substantially in a radial direction of the girth gear, wherein the first side is secured to the rim and the second side is spaced from the web.

* * * * *